United States Patent
Cho

[19]

[11] Patent Number: 6,111,617
[45] Date of Patent: *Aug. 29, 2000

[54] MONITOR SHELL

[75] Inventor: Chun-Jung Cho, Taoyuan Hsien, Taiwan

[73] Assignee: Acer Peripherals, Inc., Taiwan

[*] Notice: This patent is subject to a terminal disclaimer.

[21] Appl. No.: 09/388,931

[22] Filed: Sep. 2, 1999

Related U.S. Application Data

[63] Continuation of application No. 09/133,377, Aug. 13, 1998, Pat. No. 6,034,745.

[30] Foreign Application Priority Data

Feb. 23, 1998 [TW] Taiwan ................................. 87202597
Mar. 17, 1998 [CN] China .................................. 98209187

[51] Int. Cl.[7] ............................. H04N 5/64; A47B 81/06
[52] U.S. Cl. ............................................ 348/836; 312/7.2
[58] Field of Search ................................... 348/836, 839, 348/787; 312/7.2, 223.1, 223.2, 263; 361/679, 382, 796, 756, 759, 740, 741, 801, 802, 683; 248/917, 918, 919, 920, 921, 922, 923

[56] References Cited

U.S. PATENT DOCUMENTS

| 2,898,585 | 8/1959 | Bauman | 348/836 X |
|---|---|---|---|
| 3,572,865 | 3/1971 | Attardi | 312/7.2 |
| 3,573,366 | 4/1971 | Joseph | 348/836 |
| 4,646,159 | 2/1987 | Beaumont et al. | 348/836 |
| 4,666,219 | 5/1987 | Higuchi et al. | 348/836 X |
| 5,294,994 | 3/1994 | Robinson et al. | 348/836 X |
| 5,363,150 | 11/1994 | Kojima | 312/7.2 X |
| 5,518,216 | 5/1996 | Wu | 248/921 X |
| 5,575,545 | 11/1996 | Wang | 312/223.2 X |
| 5,682,300 | 10/1997 | Sung | 312/7.2 X |
| 5,844,635 | 12/1998 | Kim | 348/836 X |
| 5,969,776 | 10/1999 | Han | 348/836 |
| 5,990,985 | 11/1999 | Kim | 348/836 |

FOREIGN PATENT DOCUMENTS

| 1186039 | 8/1959 | France | 312/7.2 |
|---|---|---|---|
| 2554299 | 5/1985 | France | 312/7.2 |

*Primary Examiner*—Peter M. Cuomo
*Assistant Examiner*—James O. Hansen
*Attorney, Agent, or Firm*—Pillsbury Madison & Sutro LLP

[57] ABSTRACT

A monitor shell includes a frame detachably and horizontally mounted to a seat, which is attached to the bottom of a metal housing for holding a cathode-ray tube. A circuit board is mounted on the detachable frame so that it is not necessary to detach the metal housing when repair or maintenance of the circuit board is needed.

3 Claims, 7 Drawing Sheets

MONITOR SHELL

This is a continuation of application Ser. No. 09/133,377, filed Aug. 13, 1998 now U.S. Pat. No. 6,034,745.

FILED OF THE INVENTION

The present invention relates to a monitor shell, in particular to a shell structure of a computer monitor.

DESCRIPTION OF RELATED ART

Figure 1:
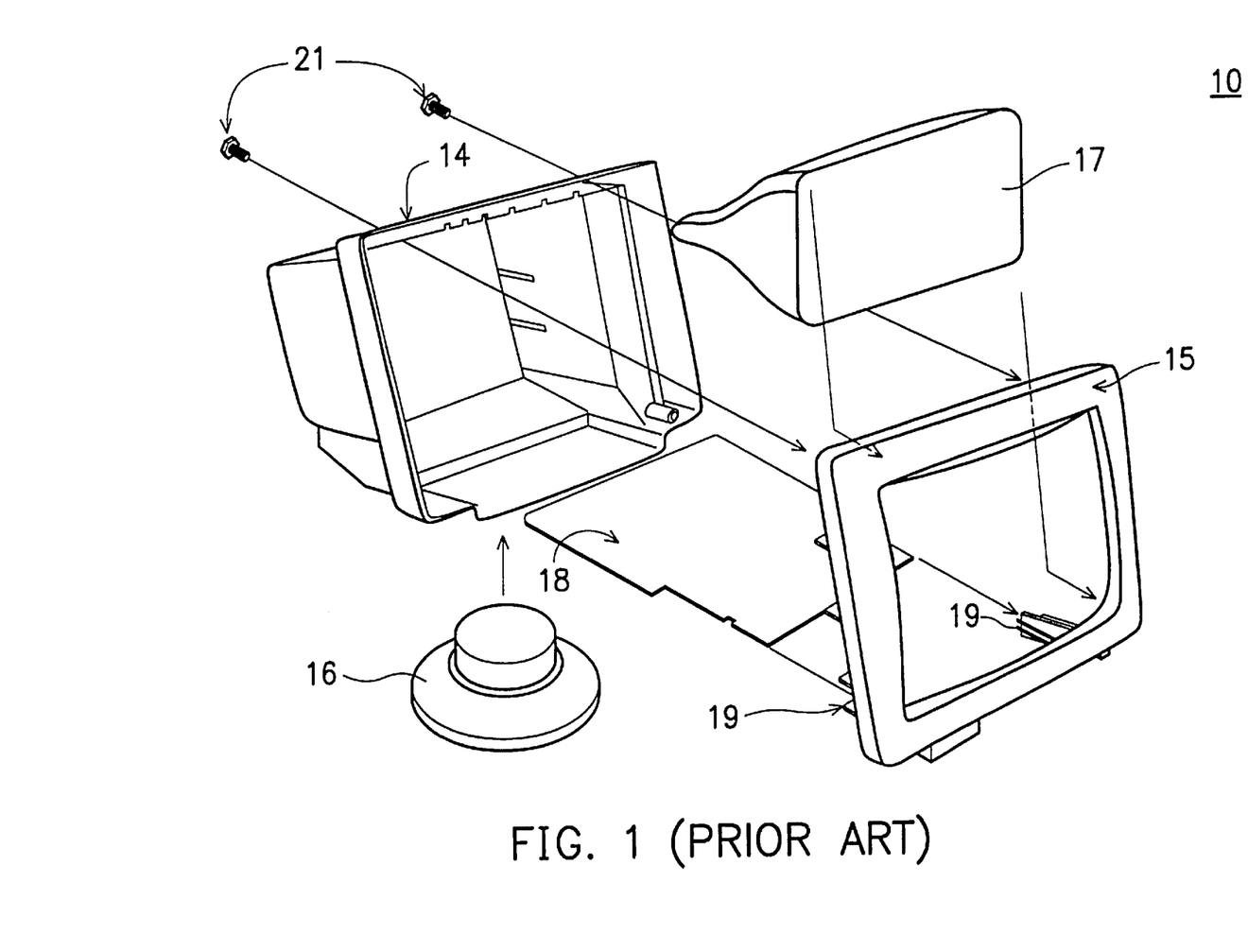
FIG. 1 is a perspective view showing the monitor shell structure of Taiwan Patent No. 184,609.

Referring to FIG. 1, an exploded view of a monitor shell structure 10 disclosed in Taiwan Patent No. 184,609 is shown. The shell structure includes a case 14, a front panel 15, and a base 16. A pair of slide slots 19, 19 are formed at the inner bottom side of the front panel 15 so that a circuit board 18 can be freely inserted therein. This shell structure 10 facilitates the mounting procedures of the circuit board 18 and the changing of components of the circuit board 18 when the repair and maintenance of the circuit board 18 are required. The circuit board 18 occupies a space under the cathode-ray tube 17 when the circuit board 18 is slidden into the slots 19, and thus in the assembling of the monitor, the cathode-ray tube 17 is first mounted on the front panel 15 and the front panel 15 is then engaged with the case 14 by, for example, using screw bolts 21. With the increase of the size of the monitor, the weight of the cathode-ray tube 17 is also increased. By using the above shell structure, the screw bolts 21 for engaging the front panel 15 on the case 14 frequently cannot withstand the weight of the cathode-ray tube, resulting in the separation or breakage of the front panel 15 and the case 14.

To eliminate the above problems, a new design using a metal housing to hold the cathode-ray tube before it is mounted on the base has been recently developed in the assembly of large-size monitors. In this way, the weight of the cathode-ray tube 17 is directly applied onto the metal housing and the base, then the separation or break of the case and the front panel is avoided.

However, to reserve the space above the cathode-ray tube for heat dissipation, the circuit board is designed to be disposed under the cathode-ray tube, and the circuit board must be enclosed by the metal housing to avoid abutment against the base. Should components on the circuit board need changing, the metal housing must be first detached. And when the metal housing is detached, the monitor can not be placed horizontally and must be placed with the CRT screen facing downward, causing inconvenience when repairing the circuit board.

SUMMARY OF THE INVENTION

It is therefore an object of the invention to provide a monitor shell structure that can eliminate the above problems.

To attain the above object, the invention uses a detachable frame horizontally mounted to a seat which is attached to the bottom of a housing for holding a cathode-ray tube. The circuit board is mounted on the detachable frame so that it is not necessary to detach the housing when repair or maintenance of the circuit board is needed. The cathode-ray tube is held by the housing, and thus no separation or breakage of the case and front panel occurs.

According to an aspect of the invention, the frame is retractably mounted to the seat.

According to another aspect of the invention, a shield plate is mounted under the frame for shielding the circuit board from electromagnetic irradiation.

According to a further aspect of the invention, a base is mounted under the shield plate, and the bottom surface of the shield plate under which the base is mounted is corrugated to increase the support load of the shield plate.

BRIEF DESCRIPTION OF THE DRAWINGS

The invention is hereinafter described in detail by the preferred embodiment with reference to the accompanying drawings wherein:

FIG. 8b is a schematic side view of FIG. 8a;

FIG. 9b is a schematic view of FIG. 9a; and

DETAILED DESCRIPTION OF CURRENTLY PREFERRED EMBODIMENT

Figure 2:
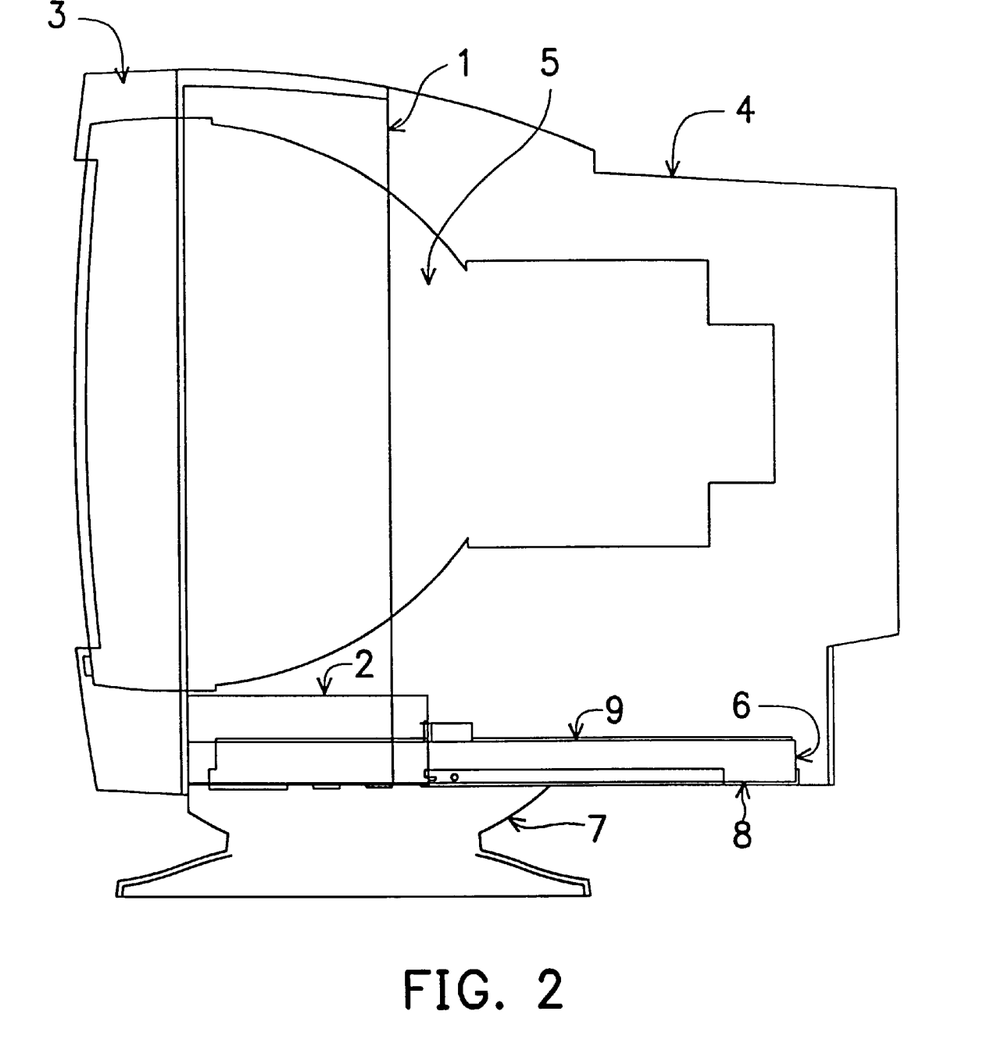
FIG. 2 is a schematic side view showing the shell structure of one of the preferred embodiments of the invention.

Referring to FIG. 2, the monitor shell of the invention includes a case 4, a front panel 3 which is mounted on the case 4 by, for example, screw bolts (not shown) or other means, a seat member 2, a frame 6 and a base 7. A cathode-ray tube 5 is held by a housing 1 and disposed in the case 4. The seat member 2 is attached to the bottom of the metal housing 1. A shield plate 8 for shielding electromagnetic irradiation is mounted under the frame 6.

Figure 3:
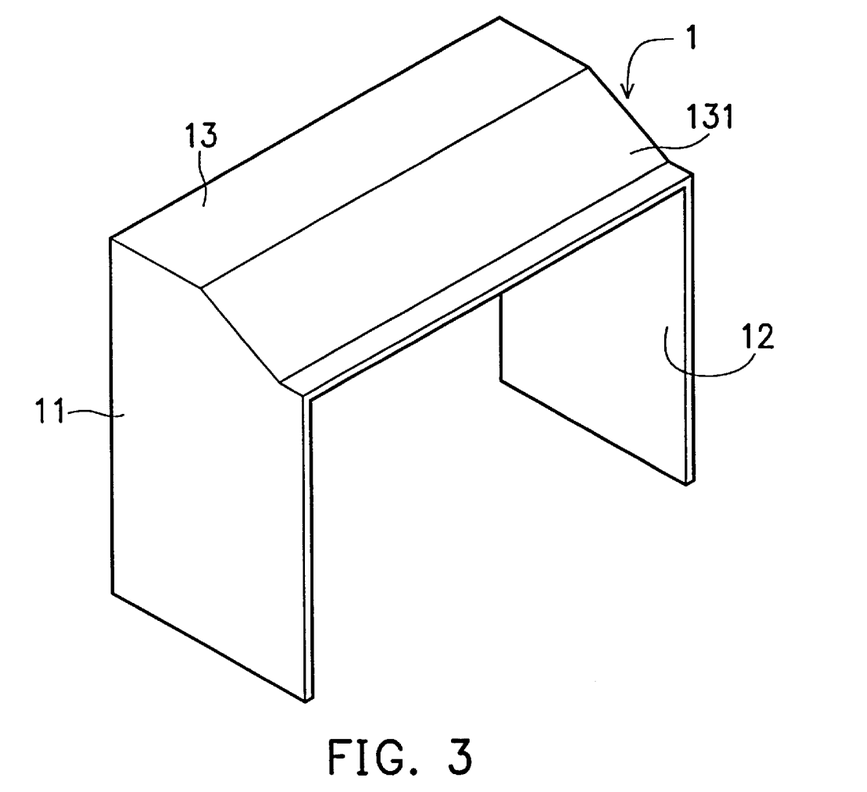
FIG. 3 is a perspective view of the metal housing.

Referring now to FIG. 3, the housing 1 includes two opposed upright plates 11, 12 and a top plates 13 connecting the two opposed upright plates 11, 12. The top plates 13 includes an inclined surface 131 to conform to the shape of the case 4 when the housing 1 is mounted in the case 4. The housing is preferably made of metal to have sufficient strength for holding the cathode-ray tube 5.

Figure 4:
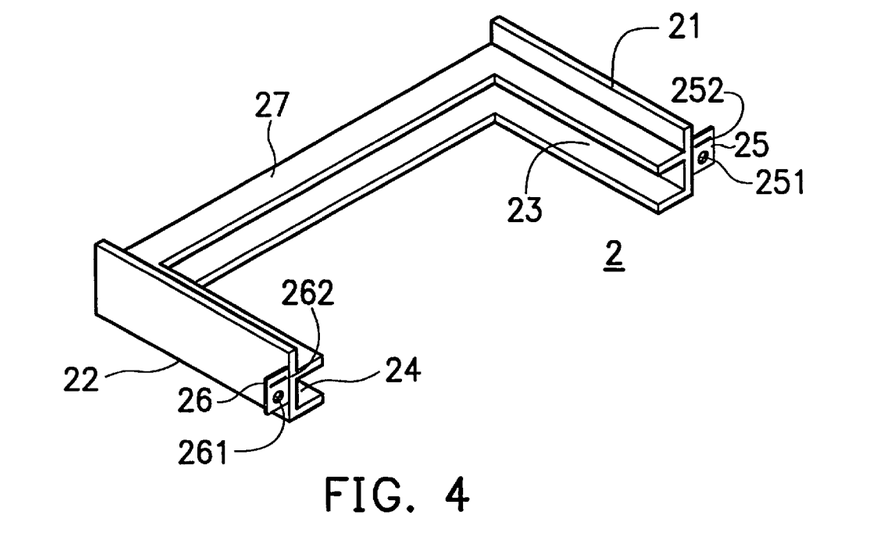
FIG. 4 is a perspective view of the U-shaped seat member.

Referring to FIG. 4, a perspective view of the seat member 2 is shown. The seat member 2 is a U-shaped bracket and includes two opposed bars 21, 22 and a connecting bar 27 connecting the two bars 21, 22. As shown in the drawing, the two opposed bars 21, 22 include respectively a groove 23 and a groove 24 formed along their longitudinal axes. The bars 21 and 22 also include, respectively, a first laterally protruded plate 25, and a second laterally protruded plate 26 at their free ends. The first laterally protruded plate 25 has a first hole 251 and a first slot 252. The second laterally protruded plate 26 has a second hole 261 and a second slot 262.

Figure 5:
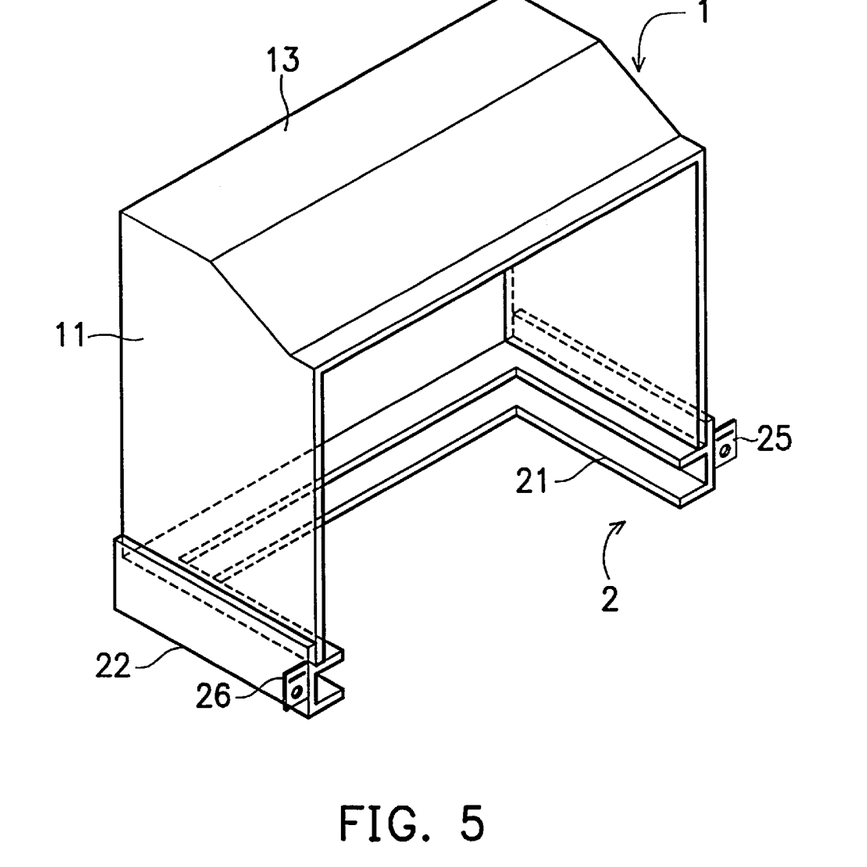
FIG. 5 is a perspective view showing the U-shaped seat member mounted under the metal housing.

Referring to FIG. 5, the housing 1 is mounted on the seat 2 with the two opposed upright plates 11, 12 being seated on and attached to the bars 21, 22, respectively. Alternatively, the U-shaped seat 2 can be integrally formed with the housing 1 by, for example, using metals.

Figure 6:
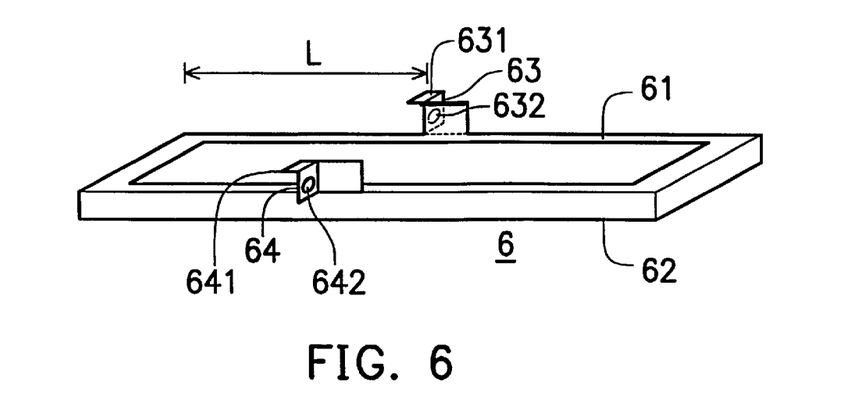
FIG. 6 is a perspective view showing the frame.

Referring to FIG. 6, the frame 6 is a rectangular frame including a bar 61 and a bar 62 disposed parallel to the bar 61. Note that the width of the rectangular frame 6 is substantially the same as the width between the bar 21 and bar 22 of the U-shaped bracket 2 so that the bar 61 and the bar 62 of the rectangular frame 6 can be horizontally received in the grooves 23, 24 respectively. At the bar 61, an upwardly protruded plate 63 is formed, and at the bar 62 opposite plate 63, an upwardly protruded plate 64 is formed. The upwardly protruded plate 63 has a protrusion 631 disposed toward the left and a hole 632 formed thereunder. The upwardly plate 64 has a protrusion 641 disposed toward left and a hole 642. Note that the distance L from the upwardly protruded plate 63 to the left end of the rectangular frame 6 is substantially the same as the length of the bars 21, 22 of the U-shaped bracket 2. Therefore, when rectangular frame 6 is received in the grooves 23, 24 to a fully retracted position, the rectangular frame 6 can be engaged with the U-shaped seat 2 by using a screw bolt, as will be described hereinafter.

Figure 7A:
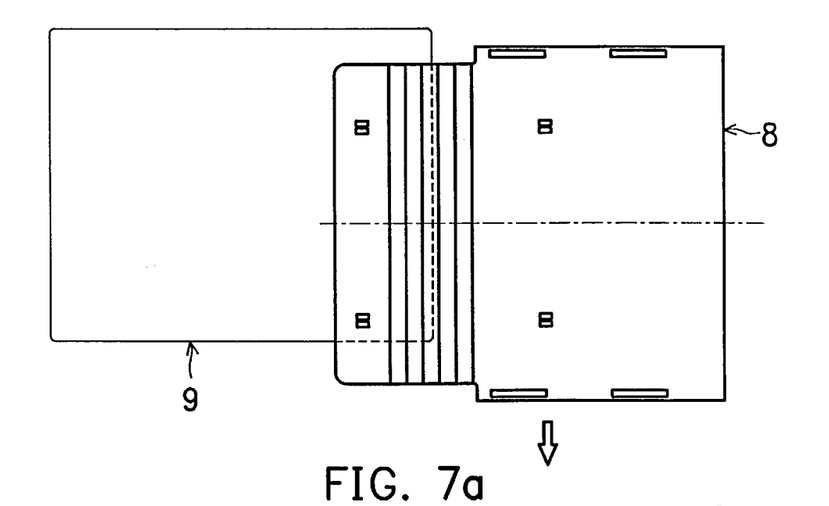
FIG. 7a is a schematic bottom view showing how to mount the circuit board on the frame.
Figure 7B:
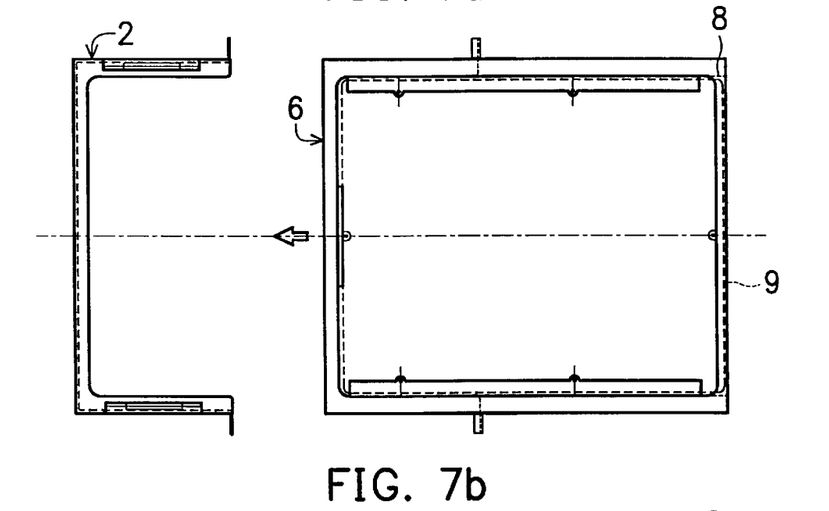
FIG. 7b is a schematic bottom view showing how to mount the frame on the U-shaped seat member.
Figure 7C:
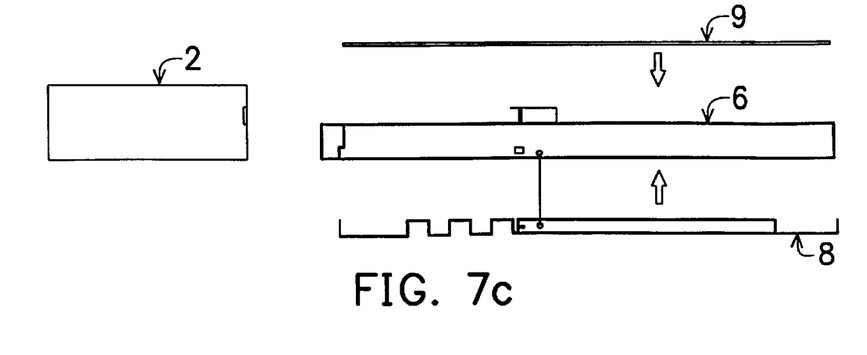
FIG. 7c is a schematic side view showing the U-shaped seat member, the circuit board, the frame and the shield plate before they are assembled together.

Referring now to FIG. 7a, the shield plate 8 has been mounted under the frame 6. The shield plate 8 is preferably made of metal so that the electromagnetic irradiation can be shielded. FIG. 7a shows a circuit board 9, which is to be mounted on the frame 6. After the circuit board 9 has been mounted on the frame 6, the frame 6 is inserted into the grooves 23, 24 of the U-shaped bracket 2, as shown in FIG. 7b. FIG. 7c is a side schematic view showing the U-shaped seat member 2, the circuit board 9, the frame 6 and the shield plate 8 before they are assembled together. Note the a part of the surface of the shield plate 8 is corrugated to increase the support load of the shield plate 8. The base 7 is mounted under the corrugated shield plate 8.

Figure 8A:
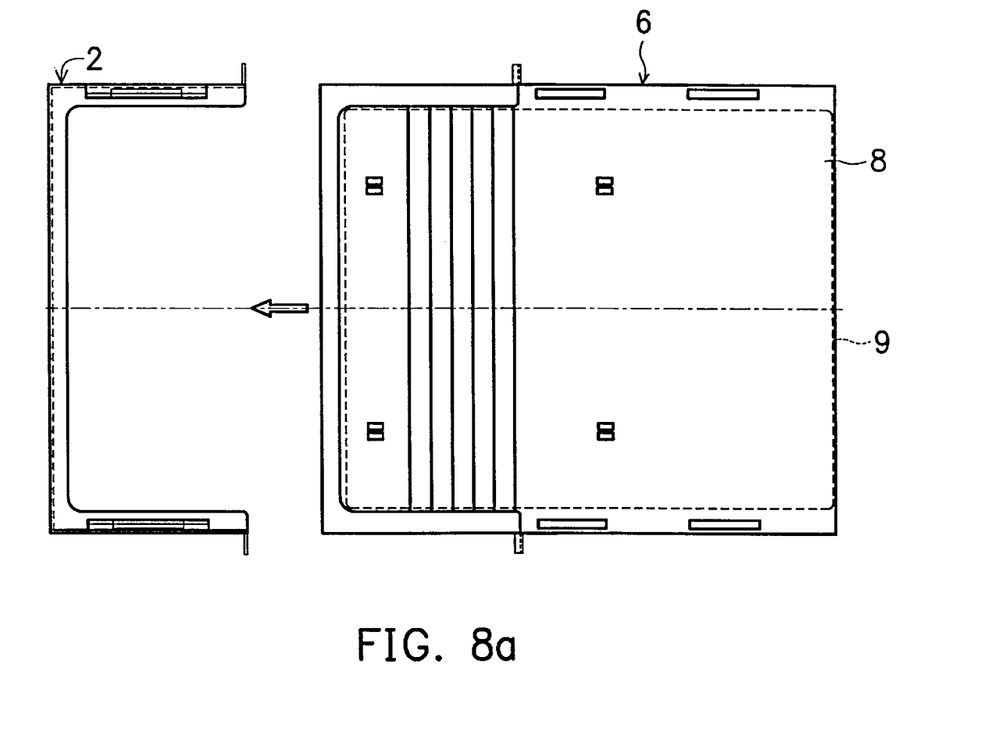
FIG. 8a is a schematic bottom view showing the shield plate mounted on the frame before the frame is inserted in the seat member.
Figure 8B:
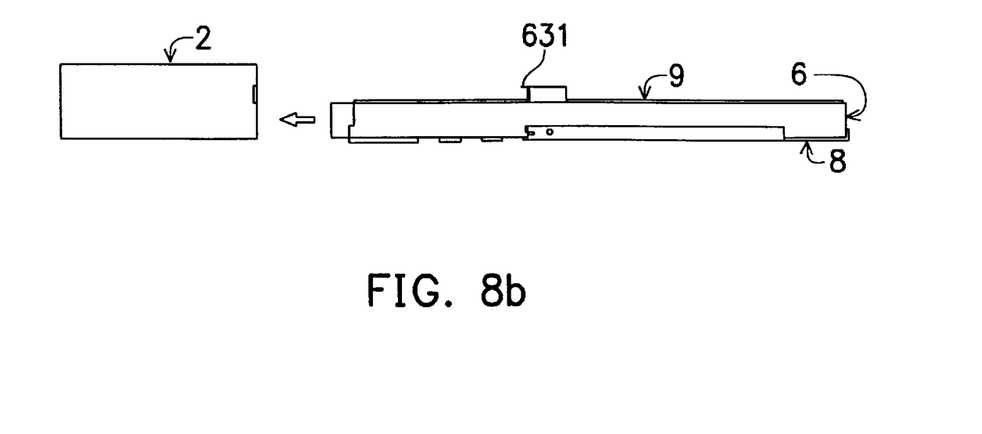

FIG. 8a is a schematic bottom view showing the shield plate 8 mounted on the frame 6 before the frame 6 is inserted in the seat member 2. FIG. 8b is a schematic side view of FIG. 8a.

Figure 9A:
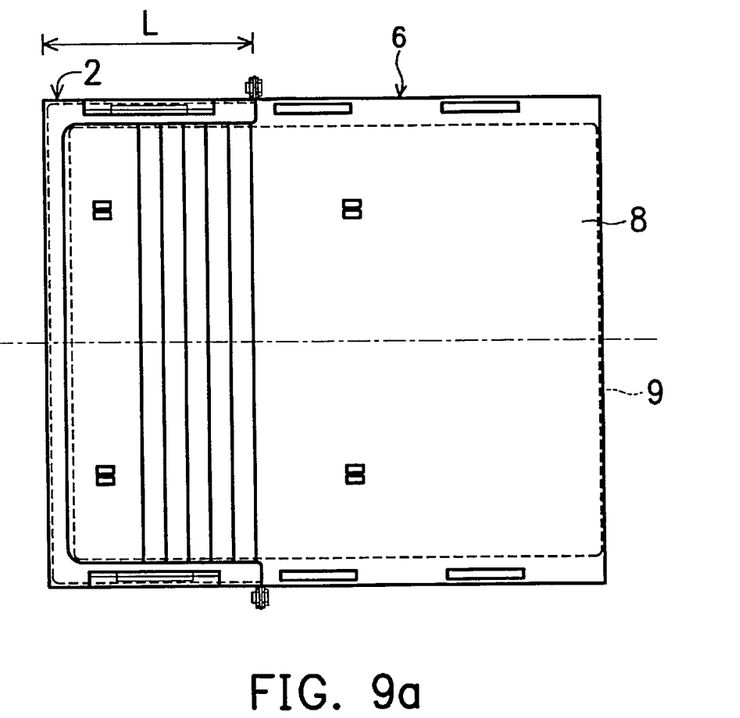
FIG. 9a is a bottom view showing that the shield plate mounted on the frame and the frame inserted in the seat member.
Figure 9B:
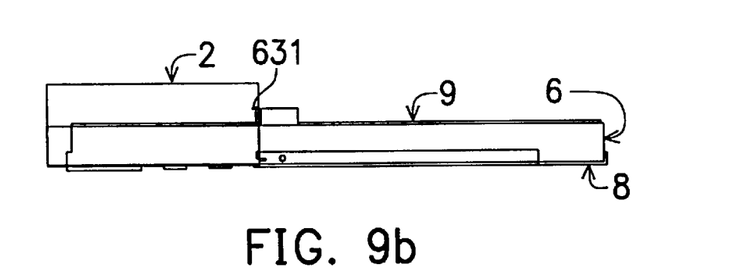
Figure 10:
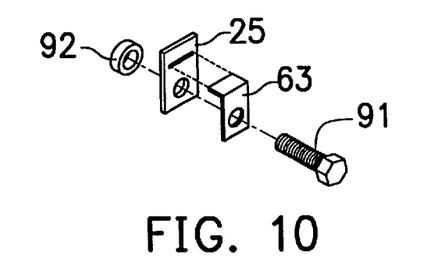
FIG. 10 is an exploded perspective view showing the means for engaging the frame with the seat member.

Referring now to FIG. 9a, the shield plate 8 has been mounted on the frame 6 and the frame 6 has been inserted in the seat member 2. FIG. 9b is a schematic view of FIG. 9a. As shown in FIG. 9a and FIG. 9b, when the length L of the frame 6 has been fully inserted in the seat member 2, the protrusion 631 of the upwardly protruded plate 63 is inserted into the slot 252 of the laterally protruded plate 25, and the hole 632 of the upwardly protruded plate 63 is in line with the hole 251 of the laterally protruded plate 25 while the protrusion 641 of the upwardly protruded plate 64 is inserted into the slot 262 of the laterally protruded plate 26 and the hole 642 of the upwardly protruded plate 64 is in line with the hole 261 of the laterally protruded plate 26. The upwardly protruded plate 63 and the laterally protruded plate 25 can be engaged together by using a screw bolt 91 and a nut 92 as shown in FIG. 10.

When repair of the components of the circuit board 9 is required, having the shell structure as described above, makes the operation easy to perform after detaching the shield plate 8 from the frame 6. If the circuit board 9 is to be replaced, the frame 6 can be pulled out after disengaging the screw bolt 9, and thus it is not necessary to detach the metal housing 1.

What is claimed is:

1. A monitor shell, comprising:
   a case for receiving a cathode-ray tube;
   a housing received in said case and vertically extended along a sidewall of said cathode-ray tube, said housing having a bottom end;
   a scat member attached to said bottom end of said housing;
   a front panel disposed in front of said case for a covering a portion of said cathode-ray a frame detachably and retractably received in said seat member for receiving a circuit board;
   a shield plate detachably mounted to said frame, said shield plate having a bottom surface; and
   a base mounted to said bottom surface of said shield plate, wherein weight of said cathode-ray tube is directly applied onto said base through said direct mounting of said base to said shield plate.

2. The monitor shell as claimed in claim 1, wherein a part of said bottom surface of said shield plate is corrugated for mounting said base.

3. The monitor shell as claimed in claim 1, said frame including two spaced-apart bars, wherein said circuit board can be repaired through a space between said spaced-apart bars after detaching said shield plate from said frame.

* * * * *

UNITED STATES PATENT AND TRADEMARK OFFICE
CERTIFICATE OF CORRECTION

PATENT NO. : 6,111,617
DATED : August 29, 2000
INVENTOR(S) : CHO

Page 1 of 1

It is certified that error appears in the above-identified patent and that said Letters Patent is hereby corrected as shown below:

Column 4,
Line 27, change "scat" to --seat--.
Line 30, change "cathode-ray" to --cathode ray tube;- and before "a frame"; indent as new paragraph.

Signed and Sealed this

Third Day of July, 2001

Attest:

NICHOLAS P. GODICI
Attesting Officer    Acting Director of the United States Patent and Trademark Office